United States Patent
Koike

(10) Patent No.: US 10,070,389 B2
(45) Date of Patent: Sep. 4, 2018

(54) RELAY APPARATUS

(71) Applicant: DENSO CORPORATION, Kariya, Aichi-pref. (JP)

(72) Inventor: Tomoyuki Koike, Kariya (JP)

(73) Assignee: DENSO CORPORATION, Kariya (JP)

( * ) Notice: Subject to any disclaimer, the term of this patent is extended or adjusted under 35 U.S.C. 154(b) by 63 days.

(21) Appl. No.: 15/067,805

(22) Filed: Mar. 11, 2016

(65) Prior Publication Data

US 2016/0278017 A1   Sep. 22, 2016

(30) Foreign Application Priority Data

Mar. 20, 2015   (JP) .................... 2015-058113

(51) Int. Cl.
| | |
|---|---|
| *H04L 12/703* | (2013.01) |
| *H04W 40/22* | (2009.01) |
| *H04L 25/20* | (2006.01) |
| *H04W 52/02* | (2009.01) |
| *H04W 76/27* | (2018.01) |
| *H04L 29/12* | (2006.01) |

(52) U.S. Cl.
CPC ....... *H04W 52/0235* (2013.01); *H04W 76/27* (2018.02); *H04L 61/103* (2013.01); *Y02D 70/00* (2018.01)

(58) Field of Classification Search
CPC .... H04L 1/40006; H04L 40/22; H04L 61/103
USPC ....................................... 370/401
See application file for complete search history.

(56) References Cited

U.S. PATENT DOCUMENTS

| | | | |
|---|---|---|---|
| 6,778,542 B1* | 8/2004 | Hassan-Ali | H04L 12/5601 370/252 |
| 2009/0285221 A1 | 11/2009 | Ito | |
| 2010/0169717 A1* | 7/2010 | Sonoda | H04L 12/437 714/48 |
| 2012/0063356 A1 | 3/2012 | Ito | |
| 2012/0207154 A1* | 8/2012 | Pham | H04L 41/0813 370/389 |

(Continued)

FOREIGN PATENT DOCUMENTS

| | | |
|---|---|---|
| JP | 2010-161656 A | 7/2010 |
| JP | 2012-011888 A | 1/2012 |
| JP | 2013-197982 A | 9/2013 |

OTHER PUBLICATIONS

1394 Trade Association. 2003. "TA Document 2001018, IDB-1394 Automotive Specification 1.0," p. 27.

*Primary Examiner* — Asad Nawaz
*Assistant Examiner* — Jason Harley
(74) *Attorney, Agent, or Firm* — Posz Law Group, PLC

(57) ABSTRACT

A relay apparatus for data relay between multiple communication lines includes a sleep relay unit, a start-up determination unit and a communication block unit. The sleep relay unit relays a sleep instruction that instructs a designated apparatus to transition to a sleep mode. The start-up determination unit determines whether or not a start-up apparatus, which is an apparatus other than the designated apparatus and is in a normal mode, exists in a designated communication line, which is a communication line connected to the designated apparatus. Communication that uses the designated communication line is blocked by the communication block unit when it is determined that the start-up apparatus does not exist in the designated communication line.

7 Claims, 6 Drawing Sheets

(56) References Cited

U.S. PATENT DOCUMENTS

2014/0254471 A1\* 9/2014 Fang ................... H04W 84/047
370/315
2015/0015916 A1 1/2015 Kikuchi
2018/0005093 A1 1/2018 Kikuchi \* cited by examiner

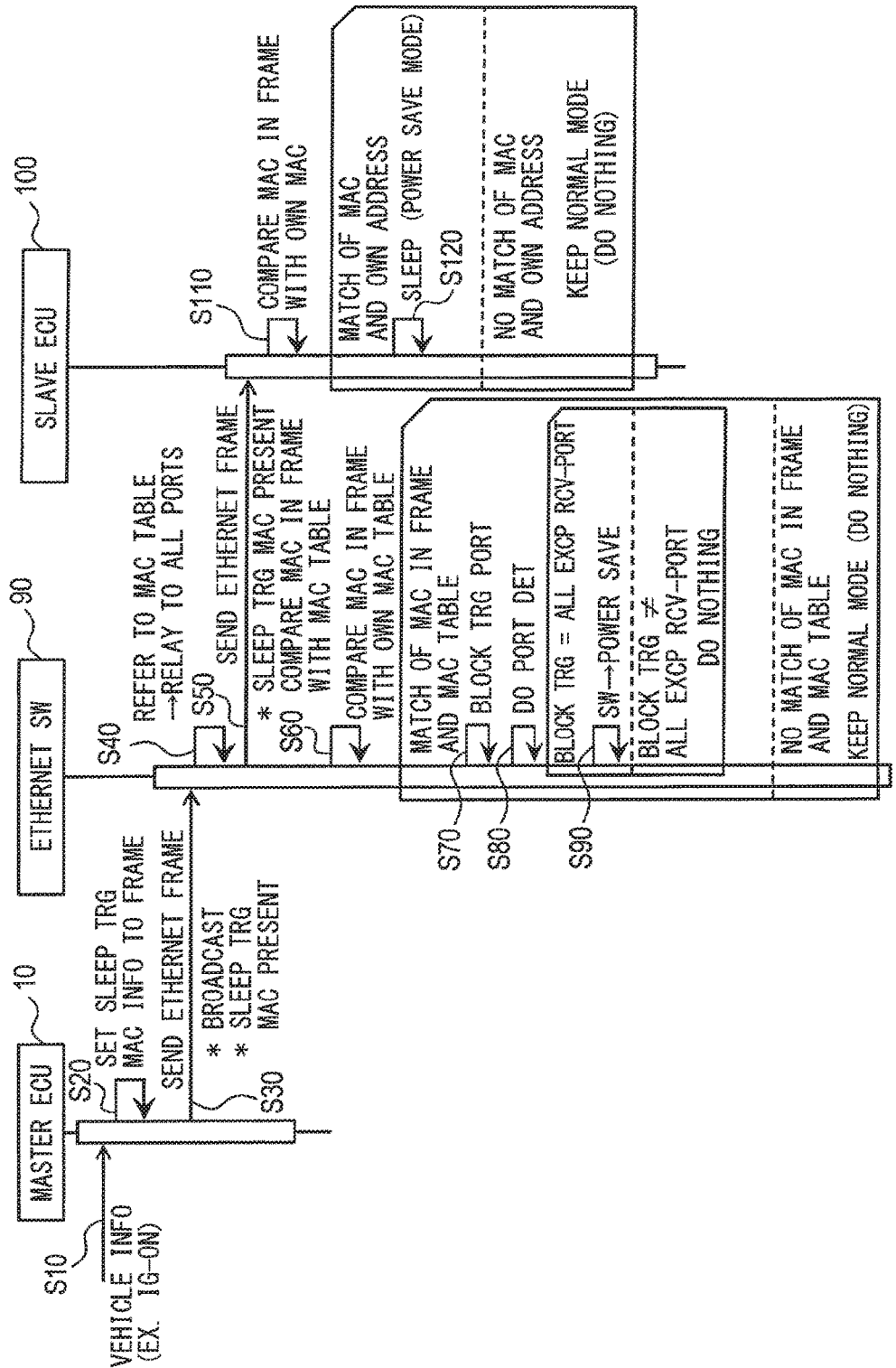

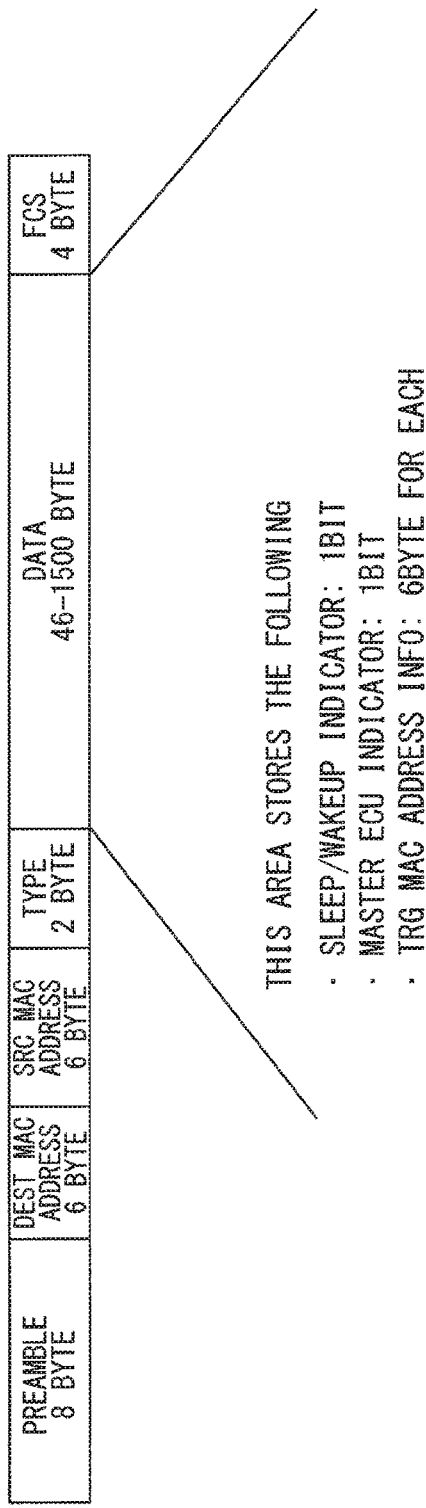

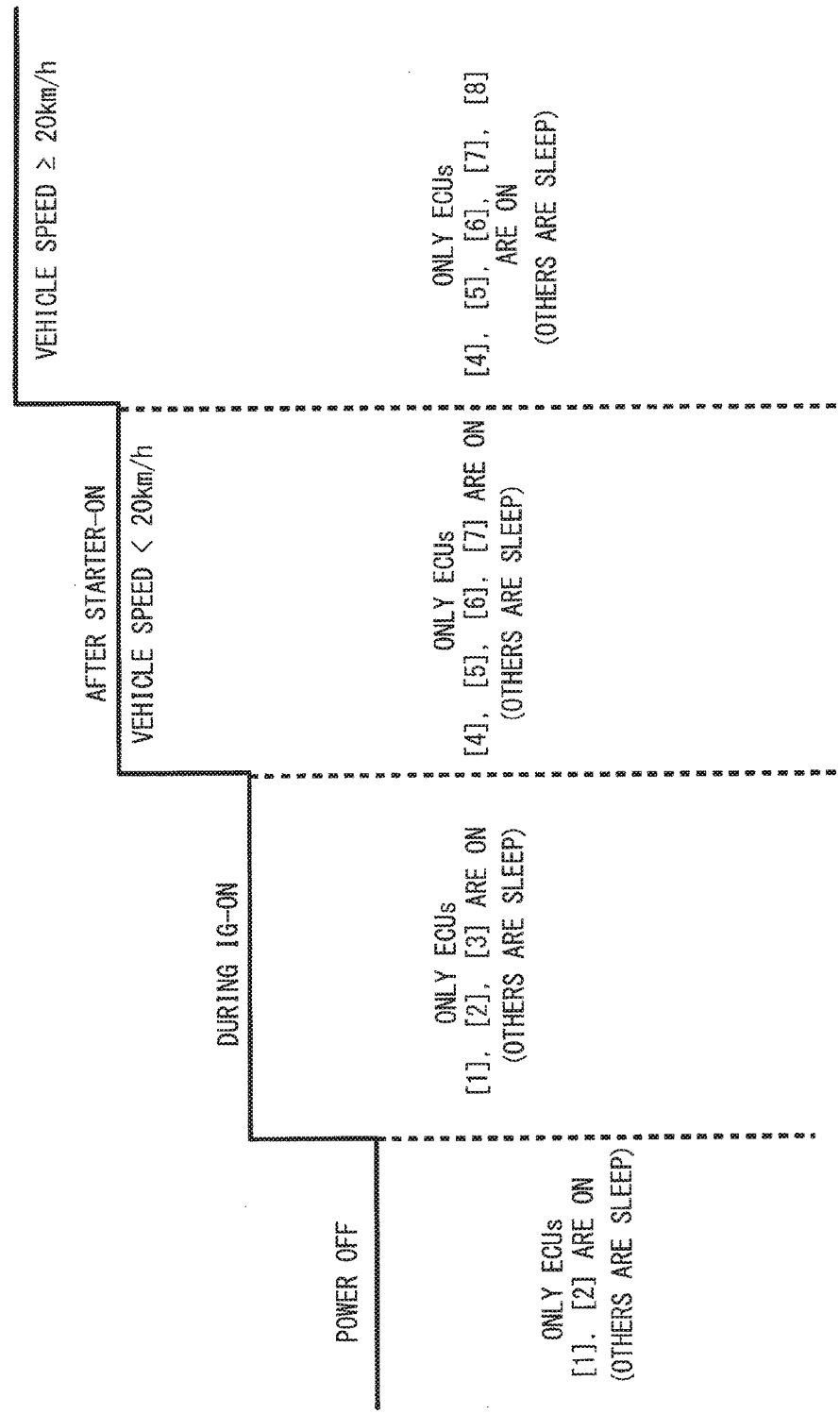

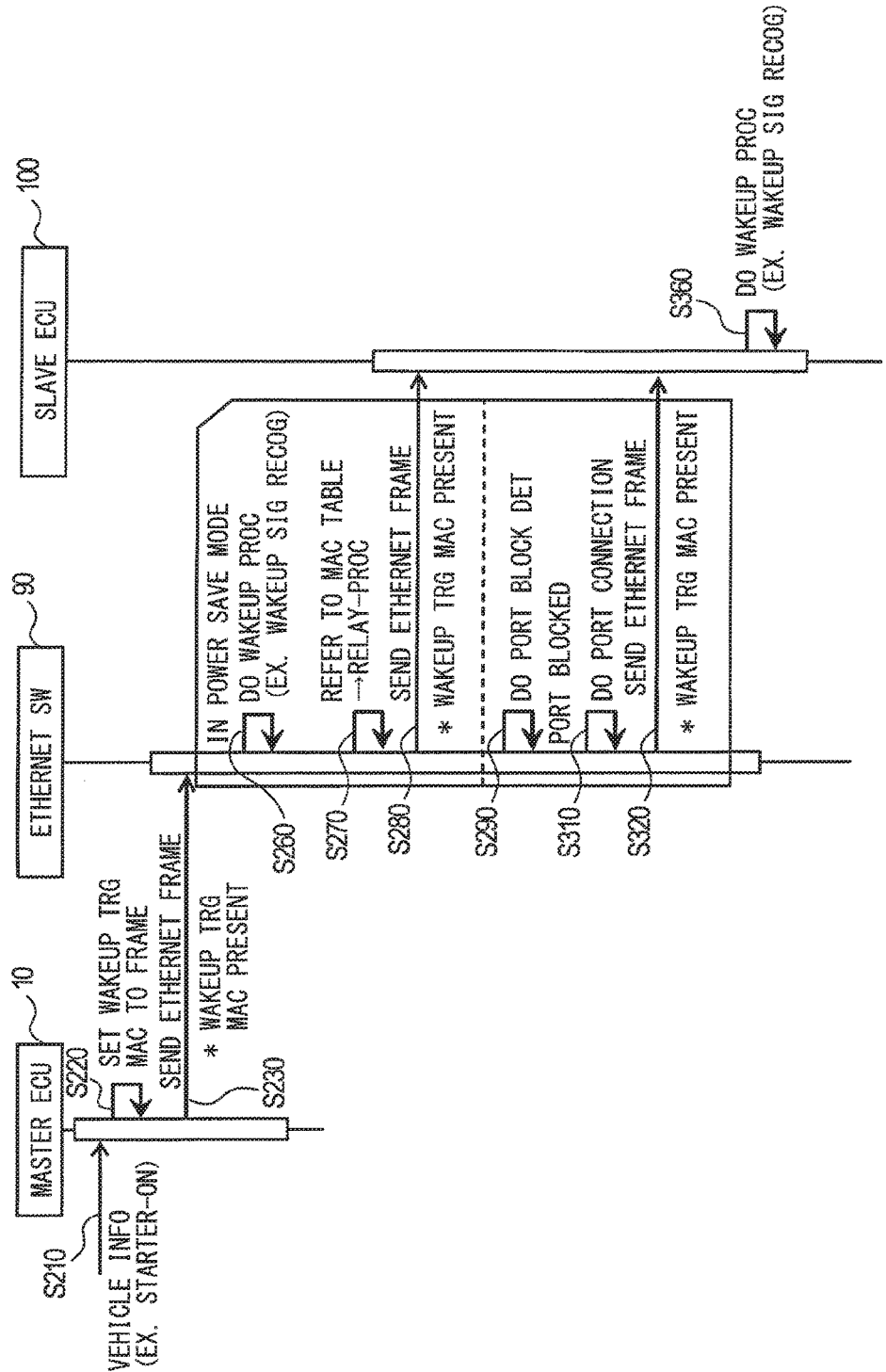

RELAY APPARATUS

CROSS REFERENCE TO RELATED APPLICATION

The present application is based on Japanese Patent Application No. 2015-58113 filed on Mar. 20, 2015, disclosure of which is incorporated herein by reference.

TECHNICAL FIELD

The present disclosure relates to a relay apparatus for performing data relay between multiple communication lines.

BACKGROUND

In a known system, multiple communication apparatuses are connected in a network and a communication apparatus transitions to a sleep mode upon satisfaction of a predetermined sleep condition to reduce power consumption of the communication apparatus (see Patent Literature 1 for example).

Patent Literature 1: JP 2013-150346A

SUMMARY

In a communication network, there is a demand to reduce power consumption of the network as a whole. In view of this demand, it is an object of the present disclosure to provide a technology for reducing power consumption in a communication network.

A relay apparatus in an aspect of the present disclosure is connected to a plurality of communication lines to perform data relay between the plurality of communication lines. The relay apparatus comprises a sleep relay unit, a start-up determination unit and a communication block unit. Upon receipt of a sleep instruction that instructs a designated communication apparatus to transition to a sleep mode, the sleep relay unit relays the sleep instruction to the designated communication apparatus. The start-up determination unit determines whether or not a start-up communication apparatus, which is a communication apparatus other than the designated communication apparatus and is in a normal mode different from the sleep mode, exists in a designated communication line, which is a communication line connected to the designated communication apparatus. When the start-up determination unit determines that the start-up communication apparatus does not exist in the designated communication line, the communication block unit blocks communication that uses the designated communication line.

According to this relay apparatus, not only the communication apparatus is placed in the sleep mode but also the communication using the communication line is blocked. Therefore, the power saving is realized in a whole network including the relay apparatus and the communication apparatus.

BRIEF DESCRIPTION OF THE DRAWINGS

The above and other objects, features and advantages of the present disclosure will become more apparent from the below-described detailed description made with reference to the accompanying drawings, in which:

FIG. 2 is a ladder chart showing process procedures of respective apparatuses in transition to a sleep mode;

FIG. 3 is an explanatory diagram showing a data structure of an Ethernet frame;

FIG. 4 is an explanatory diagram showing an example of a MAC address table in an Ethernet switch;

FIG. 5 is an explanatory diagram showing an example of a relationship between a vehicle state and a normal mode ECU;

FIG. 6 is a ladder chart showing process procedures of respective apparatuses in transition to a normal mode.

DETAILED DESCRIPTION

Embodiments will be described with reference to the drawings.

(Structures in the Present Embodiment)

A communication system 1 in an embodiment is mounted in a vehicle (e.g., automobile) and constitutes a communication network in the vehicle (local network). In the communication system 1, an Ethernet (registered trademark) switch and an electronic control unit (ECU) transition to a sleep mode for power saving.

Figure 1:
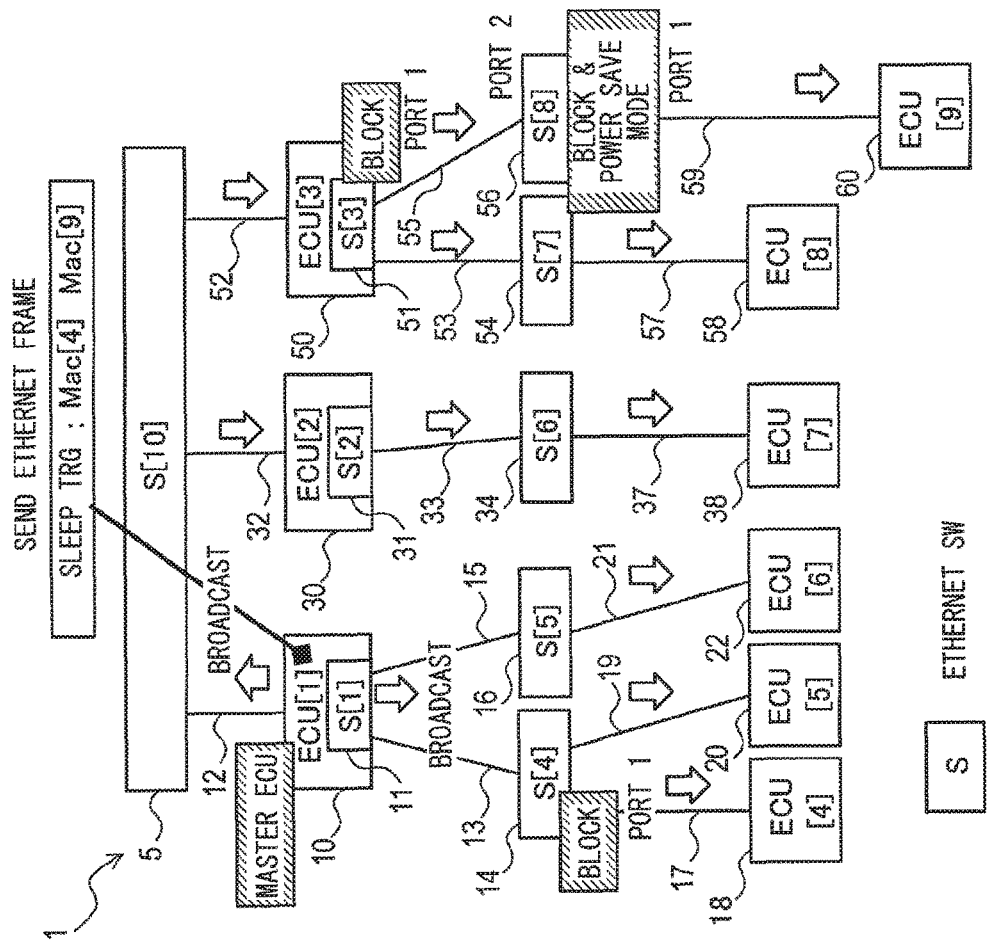
FIG. 1 is a block diagram schematically showing a communication system of an embodiment.

Specifically, as shown in FIG. 1, the communication system 1 includes multiple Ethernet switches 5, 14, 16, 34, 54, 56 and multiple ECUs 10, 18, 20, 22, 30, 38, 50, 58, 60. Each ECU 10, 18, 20, 22, 30, 38, 50, 58, 60 has a function of a microcomputer (not shown) including a CPU, a ROM, a RAM etc.

Among the multiple ECUs 10, 18, 20, 22, 30, 38, 50, 58, 60, the ECUs 10, 30, 50 further have functions of the Ethernet switches 11, 31, 51. Specifically, with the function of an Ethernet switch, the Ethernet standards-based communication is performed.

With the function of an Ethernet switch, apparatus acting as a destination is specified based on a MAC address contained in a data and the data is relayed to a communication line to which the apparatus acting as the destination is connected. In the communication system 1, all apparatuses constituting the communication system 1 perform Ethernet standards-based data exchange.

These apparatuses are arranged in a tree in which the Ethernet switch [10]5 is a root. Specifically, the Ethernet switch [10]5 is connected to the ECU [1]10, the ECU [2]30, the ECU [3]50 via the communication lines 12, 32, 52, respectively.

The ECU [1]10 is further connected to the Ethernet switch [4]14 and the Ethernet switch [5]16 via the communication lines 13, 15. The Ethernet switch [4]14 is connected to the ECU [4]18 and the ECU [5]20 via the communication lines 17, 19. The Ethernet switch [5]16 is connected to the ECU [6]22 via the communication line 21.

The ECU [2]30 is connected to the Ethernet switch [6]34 via the communication line 33. The Ethernet switch [6]34 is connected to the ECU [7]138 via the communication line 37. The ECU [3]50 is connected to the Ethernet switch [7]54 and the Ethernet switch [8]56 via the communication lines 53, 55.

The Ethernet switch [7]54 is connected to the ECU [8]58 via the communication line 57. The Ethernet switch [8]56 is connected to the ECU [9]60 via the communication line 59.

(Processes in the Present Embodiment)

In the above configuration, the ECU [1]10 functions as a master ECU which manages an operating state of the communication system 1. In particular, based on a processing result of the ECU [1]10 or a signal acquired from an outside, the ECU [1]10 designates ECU(s) to transition to a sleep mode or a normal mode and sends an instruction to these ECUs. The sleep mode is for power saving. The normal mode is realized when an ECU in the sleep mode wakes up. The normal mode is a mode in which the communication is performed without power saving, in contrast to the sleep mode.

When receiving the instruction, the ECU transitions to the sleep mode or the normal mode according to the instruction. In that regard, the Ethernet switch, which performs data relay, also transitions to the sleep mode or the normal mode on an as-needed basis. A procedure of these processes will be described with reference to FIG. 2.

In the description with FIG. 2 and its subsequent, the ECU [1]10 is also referred to as the master ECU 10. Other ECUs 18, 20, 22, 30, 38, 50, 58, 60 except the master ECU 10 are also referred to as slave ECUs 100. Each Ethernet switch 5, 14, 15, 34, 54, 56 is also referred to as an Ethernet switch 90.

For example, when vehicle information indicating turn on of an ignition switch of the vehicle or the like is inputted to the master ECU 10 (S10), the master ECU 10 extracts a sleep target ECU and sets a MAC address of the sleep target ECU to an Ethernet frame (S20). In the above, the sleep target ECU is made correspond to the vehicle information beforehand.

As shown in FIG. 3, the Ethernet frame includes, for example, a preamble, a destination MAC address, a source MAC Address, a type, a data and an FCS. Among the above, the data area has a sleep/wakeup indicator indicating a sleep instruction or a wake instruction, a master ECU indicator indicating data from the master ECU, a target MAC address information specifying an apparatus targeted for sleep or wakeup.

The target MAC address information is configured to be capable of storing one or more target MAC addresses. By broadcast transmission, the master ECU 10 sends a sleep frame, which includes the MAC Address of the sleep target ECU, to the connected communication lines 12, 13, 15 (S30).

Upon receipt of the sleep frame, the Ethernet switch 90 refers to an MAC address table. When receiving the sleep frame, the Ethernet switch 90 makes the setting for relaying it to all ports (communication lines) because this frame is broadcast (S40).

Then, the Ethernet switch 90 sends the received sleep frame to all ports without changing the sleep frame (S50). The Ethernet switch 90 compares the MAC address information included in the received sleep frame with MAC addresses stored in its own MAC address table, thereby determining whether or not a port corresponding to the MAC address is a sleep target (S60).

Specifically, the Ethernet switch 90 determines whether or not the MAC address information included in the frame matches the MAC addresses stored in the MAC address table of the subject apparatus (Ethernet switch 90 in this case). When there is the matching, the Ethernet switch 90 determines whether or not all apparatuses existing beyond this port will be in the sleep mode. As shown in FIG. 4, the MAC address table of the Ethernet switch 90 stores its own port (port(s) of the Ethernet switch 90) and MAC address of the Ethernet switch 90 and the slave ECU 100 existing beyond the port.

In FIG. 4, only one MAC Address (mac004) is stored for the port 2. Thus, when an apparatus corresponding to this MAC Address is placed in the sleep state and the port 2 is blocked, it does not trouble communications of other apparatuses.

Thus, when the MAC address information included in the sleep frame matches the MAC address stored in of the MAC address table of the subject apparatus and all the apparatuses existing beyond this port will be in the sleep mode, the sleep target port is blocked (S70). That is, the setting for not sending data to the communication line connected to this port is made.

When the MAC address information included in the sleep frame does not match the MAC address stored in the MAS address table of the subject apparatus, the port blocking and the below-described power saving of the subject apparatus is not performed.

Subsequently, a port determination is made (S80). This process determines whether or not all the ports except a receipt port are blocking targets. Herein, the receipt port is a port that has received the sleep frame including the MAC address information directed to the sleep.

When all the port except the receipt port are blocking targets, the Ethernet switch 90 serving as the subject apparatus transitions to the power save mode (S90). Specifically, not only the port but also the apparatus as a whole is placed in the sleep in order for further power saving. When at least one port except the receipt port is not the blocking target, the subject apparatus does not transition to the power save mode Next, when the slave ECU 100 receives the sleep frame including the MAC Address of the sleep target ECU (S50), the slave ECU 100 compares the MAC Address included in the sleep frame with the MAC Address of the subject apparatus, which is the slave ECU 100 in this case (S110).

When the MAC Address included in the sleep frame matches the MAC Address of the subject apparatus, the subject apparatus transitions to the sleep mode also called the power save mode (S120). When the MAC Address included in the sleep frame does not match the MAC Address of the subject apparatus, the subject apparatus does not transition to the sleep mode.

In these processes, when the ECU [4]18 and the ECU [9]60 are the sleep targets for example, the data is relayed as shown in FIG. 1. Specifically, the master ECU 10 sends the sleep frame in which the MAC addresses of the ECU [4]18 and the ECU [9]60 are designated as the sleep targets to all the communication lines 12,13,15 connected to the master ECU 10.

The Ethernet switch [4]14 blocks the port connected to the ECU [4]18 but does not transitions to the power save because the port connected to the ECU [4]20 is not blocked. In the Ethernet switch [5]16, the MAC addresses of the ECU [4]18 and the ECU [9]60 are not stored in the MAC address table of the subject apparatus. Thus, the Ethernet switch [5]16 relays the frame but does not place any apparatuses in the sleep.

The Ethernet switch [10]5 relays the frame and does place any apparatuses in the sleep because ECUs associated with all ports have been started up (not in the sleep mode).

The ECU [2]30 and the Ethernet switch [6]34 relay the sleep frame and do not place any apparatuses in the sleep because the MAC Addresses of the ECU [4]18 and the ECU [9]60 are not stored in the MAS address tables of the subject apparatuses (the ECU [2]30 and the Ethernet switch [6]34) in this case).

The ECU [3]50 does not transition to the sleep because the ECU [8]58 has been started up. In that regard, the ECU

[3]50 blocks a port connected to the Ethernet switch [8]56 because the sleep of the ECU [9]60 causes the sleep of the Ethernet switch [8]56.

The Ethernet switch [8]56 transitions to the power save mode because the sleep of the ECU [9]60 causes the sleep of all the ports except a port that has received the frame.

In the above example, the ECU [4]18 and the ECU [9]60 are the sleep targets. However, as shown in FIG. 5, a start-up target ECU and a sleep target ECU may be changed according to a vehicle status. In the example shown in FIG. 5, during off of a vehicle power source, only the ECU [1]10 and the ECU [2]30 are started up and others are in the sleep, During ignition-on among the vehicle power source, only the ECU [1]10, ECU [2]30 and ECU [3]50 are started up and others are placed in the sleep. After a starter-on among the vehicle power source, when the vehicle speed is less than 20 km/h, the ECU [4]18, the ECU [5]20, the ECU [6]22 and the ECU [7]38 are started up and others are placed in the sleep. When the vehicle speed is equal to or greater than 20 km/h, the ECU [4]18, the ECU [5]20, the ECU [6]22, the ECU [7]38 and the ECU [8]58 are started up and others are placed in the sleep.

When the ECUs are started up and placed in the sleep in the above ways, the master ECU [1]10 is in the normal mode. When the master ECU [1]10 is in the sleep mode, another ECU may function as a master ECU.

When the ECUs operate in the above way, it is necessary to start up the Ethernet switch 90 and the slave ECU 100. Processes for starting up the Ethernet switch 90 and the slave ECU 100 will be described with reference to FIG. 6

As shown in FIG. 6, when the vehicle information indicating, for example, turn on of the vehicle starter is inputted to the master ECU 10 (S210), the master ECU 10 sets a frame including a MAC Address of a wakeup target ECU (S220). The master ECU 10 sends this frame as a wakeup frame (S230).

The wakeup frame is unicasted designating a MAC address of a wakeup target apparatus. Thus, the wakeup frame is sent only to the port beyond which the wakeup target apparatus exists.

When the Ethernet switch 90 in the power save mode receives the frame, the Ethernet switch 90 recognizes contents (type) of the frame. Upon recognizing it as the wakeup frame, the Ethernet switch 90 wakes up (S260). That is, the subject apparatus (Ethernet switch 90 in this case) transitions from the sleep mode to the normal mode. It is noted that when receiving the sleep frame, the Ethernet switch 90 does not transition from the sleep mode to the normal mode.

Subsequently, the Ethernet switch 90 refers to the MAC address table and sets a relay destination to a port beyond which the wakeup target subject exists (S270). The Ethernet switch 90 relays the wakeup frame to the set port (S280).

When the subject apparatus is not in the power save mode, the Ethernet switch 90 determines whether or not the port beyond which the wakeup target apparatus exists is blocked (S290). When the port beyond which the wakeup target apparatus exists is blocked, the Ethernet switch 90 performs a port connection process (S310). Specifically, the port transitions form the block state to a data transmittable state. Then, the Ethernet switch 90 relays the wakeup frame to this port.

The slave ECU 100 monitors an electric potential of a bus. When the wakeup frame flows in the communication line (S280, S320), the slave ECU 100 recognizes the electric potential and wakes up (S360). That is, the subject apparatus (slave ECU 100 in this case) transitions from the power save mode to the normal mode.

Figure 7:
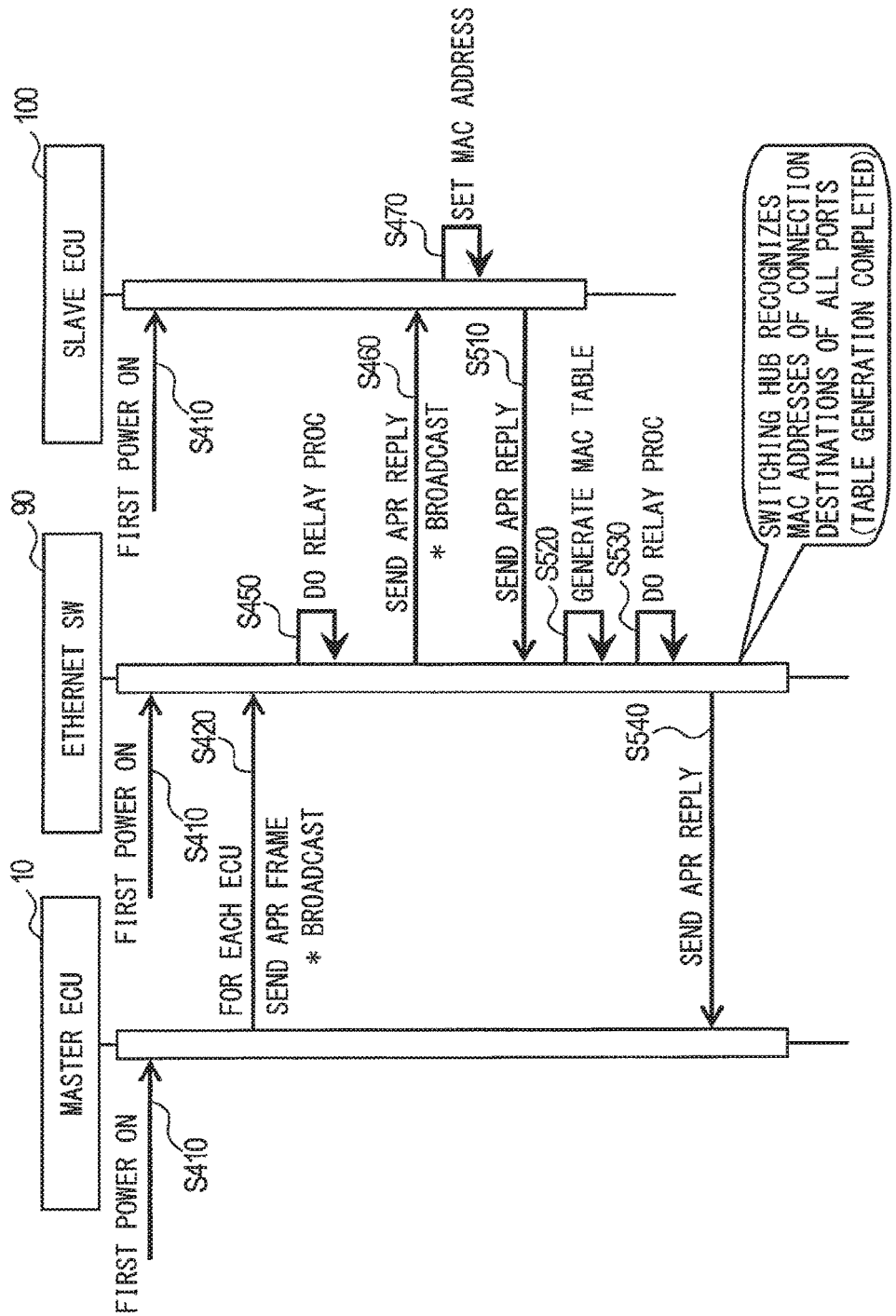
FIG. 7 is a ladder chart showing procedures of generating a MAC address table.

The MAC address table stored in the Ethernet switch 90 is generated by, for example, a procedure shown in FIG. 7. When, in response to the ignition-on or the like, the master ECU 10, the Ethernet switch 90 and the slave ECU 100 are powered on for the first time (S410), the master ECU 10 sends an APR frame for each ECU by broadcasting (S420). The APR frame includes a command which designates an IP address of an ECU and requests a MAC address.

Upon receipt of the APR frame (S420), the Ethernet switch 90 makes the setting fir relaying the received frame to all the ports the except a port that has received the frame (S450), and relays the APR frame to the set port (S460). Upon receipt of the APR frame (S460), the slave ECU 100 prepares an APR reply frame (S470). The APR reply frame includes the MAC address of the subject apparatus (the slave ECU 100 in this case). The slave ECU 100 sends the APR reply frame toward the source, which is the master ECU 10 (S510).

Upon receipt of the APR reply frame, the Ethernet switch 90 records a relationship between the port having received this APR reply frame and the MAC address in the MAC table (S520). Then, the Ethernet switch 90 sets a port for relaying this frame to the master ECU 10 (S530) and relays the APR reply frame to the set port (S540).

Thereafter, the master ECU 10 updates the APR table according to the APR reply frame, (Technical Effects in the Present Embodiment)

Upon receipt of a sleep instruction that instructs a designated communication apparatus (ECU) to transition to a sleep mode, the Ethernet switch 90 relays the sleep instruction to the designated communication apparatus. The Ethernet switch 90 determines whether or not a start-up target communication apparatus, which is a communication apparatus other than the designated communication apparatus and is in a normal mode different from the sleep mode, exists in a designated communication line, which is a communication line connected to the designated communication apparatus. When the start-up target communication apparatus does not exist in the designated communication line, the Ethernet switch 90 blocks communication that uses the designated communication line. That is, a state of no data sending or a state of no signal flow due to power off is implemented.

According to this configuration, not only the communication apparatus is placed in the sleep mode but also the communication using the communication line is blocked. Therefore, the power saving is realized in a whole network including the Ethernet switch 90 and the communication apparatus.

Additionally, the Ethernet switch 90 transitions to the sleep mode when communications using all of the communication lines except an instruction receipt communication line, which is the communication line from which the sleep instruction is received, are blocked. In the above, in the sleep mode, the Ethernet switch 90 does not send data via any communication lines.

According to this configuration, when the communications using all the communication lines except the instruction receipt communication line, which is the communication line from which the sleep instruction is received, are blocked, the Ethernet switch 90 as a whole is placed in the sleep. Therefore, further power saving can be achieved.

Additionally, upon satisfaction of a preset wakeup condition, the Ethernet switch 90 transitions from the sleep mode, in which the Ethernet switch 90 does not send data via any of the communication lines, into a start-up mode, in which the Ethernet switch 90 performs data sending.

According to this configuration, when the wakeup condition is satisfied, the Ethernet switch 90 can transition to the start-up mode. Additionally, the satisfaction of the preset wakeup condition includes the receipt of the wakeup instruction from any of the communication lines.

According to this configuration, the instruction from the communication line enables the Ethernet switch 90 to wake up.

Additionally, upon receipt of a wakeup instruction that designates a target communication apparatus which is a communication apparatus to be changed into a startup mode for data sending, the above Ethernet switch 90 releases the blocking of a communication line that is connected to the target communication apparatus.

According to this configuration, the communication line connected to the target communication apparatus can be released from the block state and can placed in a communicable state.

Additionally, the above Ethernet switch 90 changes an electric potential of the communication line connected to the target communication apparatus, for starting up the target communication apparatus.

According to this configuration, the target communication apparatus as well as the communication line can start up.

Additionally, upon receipt of an APR frame that includes an IP address of a specific communication apparatus and requests of the specific communication apparatus for an MAC address, the above Ethernet switch 90 sends the APR frame by broadcast. Upon receipt of a reply to the APR frame, the above Ethernet switch 90 generates a MAC table associating the MAC address and the IP address of the specific communication apparatus each other based on the MAC address included in the reply. Additionally, the above Ethernet switch 90 relays the reply to the APR frame to a source of the APR frame. Additionally, the above Ethernet switch 90 performs relay using the generated MAC table.

According this configuration, the Ethernet switch 90 can automatically generate the MAC table. Alternatively, the MAC table may be generated by different processes or by manual works.

(Other Embodiments)

Embodiments are not limited to the above-illustrated embodiment and embodiments can be modified, extended and combined in various ways. For example, a function of one element in the above embodiment may be distributed to multiple elements. Functions of multiple elements may be integrated into one element. A part of the above embodiment may be replaced with another part having a similar function. A part of the above embodiment may be omitted. A part of the above embodiment may be added to another embodiment and may be replaced with a part of another embodiment.

An embodiment may be the above Ethernet switch 90. Another embodiment may be a system including the above Ethernet switch 90. Another embodiment may be a program that causes a computer to function as the above Ethernet switch 90. The program may be stored in a non-transitory storage medium. Another embodiment may be a communication method using an Ethernet switch.

In the above embodiment, the Ethernet switch 90 corresponds to a relay apparatus. The Ethernet switch 90 which performs S40 and S50 among various processes corresponds to a sleep relay unit (means). The Ethernet switch 90 which performs S60 corresponds to a start-up determination unit (means).

The Ethernet switch 90 which performs S70 corresponds to a communication block unit (means). The Ethernet switch 90 which performs S80, S90 corresponds to a sleep transition unit (means). The Ethernet switch 90 which performs S230, S260 corresponds to a start-up transition unit (means). The Ethernet switch 90 which performs S230, S270, S280 corresponds to a block release unit (means).

The Ethernet switch 90 which performs S420, S450, S460, S510, S520 corresponds to a MAC table generation unit (means). The Ethernet switch 90 which performs 5540 corresponds to a replay relay unit (means).

What is claimed is:

1. An Ethernet switch connected to a plurality of communication lines to perform data relay between the plurality of communication lines, the Ethernet switch comprising:

a sleep relay unit executed by a processor that, upon receipt, from a master ECU, of an Ethernet frame including a MAC address of a designated ECU set as a sleep-target ECU and a sleep instruction that instructs the designated ECU to transition to a sleep mode, relays the Ethernet frame including the sleep instruction to the designated ECU;

a start-up determination unit executed by the processor that determines whether or not a start-up ECU, which is an ECU other than the designated ECU and the master ECU and is in a normal mode different from the sleep mode, exists in a designated communication line, which is a communication line connecting a port of the Ethernet switch and the designated ECU; and a communication block unit executed by the processor that (i) blocks the port of the Ethernet switch that is connected to the designated ECU via the designated communication line and (ii) blocks communication that uses the designated communication line, when the start-up determination unit determines that the start-up ECU does not exist in the designated communication line;

wherein the start-up determination unit determines whether the start-up ECU, which is an ECU other than the designated ECU and the master ECU and is in the normal mode, exists in a first communication line connected to a first port of the Ethernet switch and exists in a second communication line connected to a second port of the Ethernet switch; and when the start-up determination unit determines that the start-up ECU, which is an ECU other than the designated ECU and the master ECU and is in the normal mode, does not exist in the first communication line but exists in the second communication line, the communication block unit (i) blocks the first port of the Ethernet switch, thereby blocking the communication using the first communication line (ii) but does not block the second port.

2. The Ethernet switch according to claim 1, further comprising:

a sleep transition unit executed by the processor that changes the Ethernet switch into the sleep mode when communications using all of the communication lines connected to the Ethernet switch except an instruction receipt communication line, which is the communication line from which the sleep instruction is received, are blocked, wherein in the sleep mode, the Ethernet switch does not send data via any communication lines.

3. The Ethernet switch according to claim 1, further comprising:

a start-up transition unit executed by the processor that, upon satisfaction of a preset wakeup condition, changes the Ethernet switch from the sleep mode in which the Ethernet switch does not send data via any of the communication lines, into a start-up mode in which the Ethernet switch performs data sending.

4. The Ethernet switch according to claim 3, wherein:

upon receipt of a wakeup instruction from any of the communication lines, the start-up transition unit changes the Ethernet switch from the sleep mode to the start-up mode, wherein the receipt of the wakeup instruction from any of the communication lines is included in the satisfaction of the preset wakeup condition.

5. The Ethernet switch according to claim 1, further comprising:

a block release unit executed by the processor that, upon receipt of a wakeup instruction that designates a startup-target ECU which is an ECU to be changed into a startup mode for data sending, releases the blocking of a communication line that is connected to the startup-target ECU.

6. The Ethernet switch according to claim 5, wherein the block release unit changes an electric potential of the communication line connected to the startup-target ECU, for starting up the startup-target ECU.

7. The Ethernet switch according to claim 1, further comprising: a sleep transition unit executed by the processor that changes the Ethernet switch into the sleep mode when all of the ports of the Ethernet switch connected to the communication lines except an instruction receipt port, which is the port from which the sleep instruction is received, are blocked, wherein in the sleep mode, the Ethernet switch does not send data via any communication lines, when, out of all of the ports of the Ethernet switch connected to the communication lines except the instruction receipt port, at least one port is not blocked, and the sleep transition unit does not change the Ethernet switch into the sleep mode.

* * * * *